US007731771B2

(12) United States Patent
Lee et al.

(10) Patent No.: US 7,731,771 B2
(45) Date of Patent: Jun. 8, 2010

(54) CYCLONE COLLECTOR

(75) Inventors: Sung Hwa Lee, Changwon-si (KR); Kie Tak Hyun, Changwon-si (KR); Young Bok Son, Changwon-si (KR); Hyoung Joo Cho, Changwon-si (KR); Kyeong Seon Jeong, Changwon-si (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 11/662,604

(22) PCT Filed: May 24, 2005

(86) PCT No.: PCT/KR2005/001512

§ 371 (c)(1), (2), (4) Date: Feb. 4, 2008

(87) PCT Pub. No.: WO2006/031009

PCT Pub. Date: Mar. 23, 2006

(65) Prior Publication Data

US 2008/0264009 A1 Oct. 30, 2008

(30) Foreign Application Priority Data

Sep. 23, 2004 (KR) ...................... 10-2004-0076398

(51) Int. Cl.
*B01D 45/00* (2006.01)

(52) U.S. Cl. ............................ 55/343; 55/345; 55/346; 55/349; 55/447; 55/452; 55/429; 55/DIG. 3; 15/353; 15/352

(58) Field of Classification Search ................... 55/337, 55/345, 346, 349, DIG. 3, 447, 452, 343, 55/429; 15/353, 352
See application file for complete search history.

(56) References Cited

U.S. PATENT DOCUMENTS

| | | | | |
|---|---|---|---|---|
| 5,156,500 | A | 10/1992 | Pianegonda | |
| 7,070,639 | B2 * | 7/2006 | Inoue et al. | 55/429 |
| 2001/0052166 | A1 * | 12/2001 | Park et al. | 15/353 |
| 2002/0178699 | A1 * | 12/2002 | Oh | 55/337 |
| 2003/0014953 | A1 * | 1/2003 | Oh | 55/337 |
| 2003/0159239 | A1 * | 8/2003 | Oh | 15/353 |
| 2004/0098827 | A1 * | 5/2004 | Oh et al. | 15/347 |
| 2004/0103495 | A1 * | 6/2004 | Oh | 15/352 |
| 2004/0103785 | A1 | 6/2004 | North | |
| 2004/0163207 | A1 * | 8/2004 | Oh | 15/353 |
| 2004/0237482 | A1 * | 12/2004 | Lim et al. | 55/337 |
| 2005/0050678 | A1 * | 3/2005 | Oh et al. | 15/353 |
| 2005/0050863 | A1 * | 3/2005 | Oh | 55/345 |
| 2005/0050864 | A1 * | 3/2005 | Oh et al. | 55/345 |
| 2005/0050865 | A1 * | 3/2005 | Oh et al. | 55/345 |
| 2005/0172584 | A1 * | 8/2005 | Oh et al. | 55/345 |

(Continued)

FOREIGN PATENT DOCUMENTS

CN 2183223 11/1994

(Continued)

*Primary Examiner*—Jason M Greene
*Assistant Examiner*—Dung Bui
(74) *Attorney, Agent, or Firm*—Ked & Associates LLP

(57) ABSTRACT

A cyclone collector is provided that includes a body having an inlet that draws air therein, a cyclone provided inside of the body, and an outlet that discharges air from the body. The outlet includes a passage portion having a passage and a closed portion under the passage portion.

8 Claims, 5 Drawing Sheets

U.S. PATENT DOCUMENTS

| | | | | |
|---|---|---|---|---|
| 2005/0172585 | A1* | 8/2005 | Oh et al. | 55/345 |
| 2005/0172586 | A1* | 8/2005 | Oh et al. | 55/345 |
| 2005/0229554 | A1* | 10/2005 | Oh et al. | 55/346 |
| 2005/0241101 | A1* | 11/2005 | Sepke et al. | 15/353 |
| 2005/0251951 | A1* | 11/2005 | Oh et al. | 15/353 |
| 2005/0252180 | A1* | 11/2005 | Oh et al. | 55/345 |
| 2006/0053757 | A1* | 3/2006 | Han et al. | 55/337 |
| 2006/0059871 | A1* | 3/2006 | Han et al. | 55/345 |
| 2006/0075728 | A1* | 4/2006 | Oh et al. | 55/345 |
| 2006/0090428 | A1* | 5/2006 | Park et al. | 55/337 |
| 2006/0107629 | A1* | 5/2006 | Oh | 55/345 |
| 2006/0117721 | A1* | 6/2006 | Lee et al. | 55/337 |
| 2006/0162299 | A1* | 7/2006 | North | 55/345 |
| 2006/0168922 | A1* | 8/2006 | Oh | 55/337 |
| 2007/0079579 | A1* | 4/2007 | Eddington et al. | 55/337 |
| 2007/0084158 | A1* | 4/2007 | Fester | 55/337 |

FOREIGN PATENT DOCUMENTS

| | | |
|---|---|---|
| CN | 1504161 | 6/2004 |
| FR | 2855036 | 11/2004 |
| WO | WO 01/14066 | 3/2001 |

* cited by examiner

CYCLONE COLLECTOR

TECHNICAL FIELD

The present invention relates to cyclone collectors, and more particularly, to a dual cyclone collector having a plurality of cyclones connected to one another. Though application of the cyclone collector of the present invention is not limited to a vacuum cleaner, the cyclone collector of the present invention is particularly suitable to the vacuum cleaner.

BACKGROUND ART

The cyclone collector collects dust and dirt (hereafter called as dust, collectively) from air by using the principle of cyclone. The cyclone collector has wide applications, and applied to the vacuum cleaner as a domestic application.

Currently, in order to improve dust collecting performance, the dual cyclone collector having a plurality of cyclone collectors connected to one another is used. That is, the dual cyclone collector is provided with an upstream cyclone for drawing air containing dust and the like (hereafter called as "dirty air") and collecting comparatively large sized dust particles, and a downstream cyclone connected to the upstream cyclone for collecting relatively small sized dust particles. In general, the dual cyclone collector is provided with one upstream cyclone and one downstream cyclone. The downstream cyclone may have a plurality of small sized cyclones (hereafter called as "multi-cyclone collector"). An example of such a multi-cyclone collector is disclosed in Japanese utility model laid open publication No. S52-14775.

Referring to FIG. 1, a related art multi-cyclone collector will be described.

The related art multi-cyclone collector is provided with a cyclone 1 (hereafter called as "primary cyclone") for drawing external dirty air, and collecting comparatively large sized dust particles, and a cyclone 3 (hereafter called as "secondary cyclone") connected to the primary cyclone 1 for collecting comparatively small sized dust particles. The secondary cyclone 3 in the multi-cyclone is a group of small sized cyclones.

This will be described in detail.

The secondary cyclone 3 having a plurality of small sized cyclones is mounted on an outside circumference of the primary cyclone 1. The primary cyclone 1 has a first inlet 11 in an upper portion of a first body 12 of the primary cyclone 1 for drawing the dirty air in a tangential direction, and a first outlet 14 at a substantially central portion of the primary cyclone 1 for discharging primarily filtered air (hereafter called as "partially dirty air") to the secondary cyclone 3. In general, the first outlet 14 is cylindrical, with an opened bottom 14*b* and no holes in an upper portion thereof. In some cases, a filter 16 is mounted on the opened bottom 14*b*.

In the meantime, the secondary cyclone 3 has a plurality of small sized cyclones mounted on an outside circumference of the primary cyclone 1. Of course, each of the secondary cyclones 3 also has an inlet (not shown) and an outlet 34 (hereafter called as "a second inlet" and "a second outlet"). In general, between the primary cyclone 1 and the secondary cyclone 3, there is a buffering chamber 56 defined therein. Through the buffering chamber 56, air is introduced to the secondary cyclone 3 from the primary cyclone 1. Above the secondary cyclone 3, there is an outlet chamber 52 in communication with the second outlets 34 of the plurality of secondary cyclones 3, for discharging air dust collecting therefrom is completed (hereafter called as "clean air") through an outlet tube 54 via the outlet chamber 52.

The operation of the related art multi-cyclone collector will be described.

Upon putting the multi-cyclone collector into operation, to drive suction force generating means, such as a suction fan (not shown) of the vacuum cleaner, the external dirty air is introduced into an inside of the primary cyclone 1 through the first inlet 11 of the primary cyclone 1. In this instance, the dirty air is drawn in a tangential direction, and swirls along an inside wall of the first body 12 of the primary cyclone 1, during which the dust is separated from the air by centrifugal force.

In this instance, comparatively heavy and large dust particles are collected on a bottom of the primary cyclone 1, and small dust particles not collected yet swirl the inside of the primary cyclone 1 until the small dust particles rise, and is discharged through the first outlet 14.

In the meantime, the partially dirty air discharged from the primary cyclone 1 is introduced into the secondary cyclone 3 through the second inlet (not shown). Eventually, the clean air having small sized dust particles separated therefrom at the secondary cyclone 3 once again is discharged to an outside of the collector through the second outlet 34, the outlet chamber 52, and the outlet tube 54.

However, the related art multi-cyclone collector has the following problems.

First, in the related art cyclone collector, air drawn through the inlet of the primary cyclone moves down to a lower portion of the inlet, and rises again, to escape from the cyclone. Though the dust is collected in this process, there is a pressure drop occurred in the process. That is, due to a great pressure loss, the related art cyclone collector is involved in drop of suction power.

Second, in the related art cyclone collector, the dust collected at the primary cyclone is liable to fly again, and move to the secondary cyclone. Moreover, since the air in the primary cyclone moves down to the lower portion of the inlet of the primary cyclone, the dust collected at the primary cyclone is highly vulnerable to re-fly.

Third, if a filter is mounted to the inlet of the primary cyclone of the related art multi-cyclone collector, the filter is liable to clog.

DISCLOSURE OF INVENTION

Accordingly, the present invention is directed to a cyclone collector that substantially obviates one or more problems due to limitations and disadvantages of the related art.

An object of the present invention is to provide a cyclone collector which can improve suction power.

Another object of the present invention is to provide a cyclone collector which can improve dust collecting performance.

To achieve these objects and other advantages and in accordance with the purpose of the invention, as embodied and broadly described herein, a cyclone collector includes a body having an inlet for drawing air, and a cyclone inside of the body, having an outlet for discharging air from the body, wherein the outlet includes a passage portion having a passage, and a closed portion under the passage portion, the closed portion being closed.

Preferably, the passage portion includes a perforated portion having a plurality of holes each of which shape is not limited.

The passage is formed in a predetermined area of the passage portion. Preferably, the outlet has a diameter which becomes the greater as it goes toward a lower portion thereof the farther.

The outlet may be cylindrical, conical, or a combination of a cylinder and a cone. In this instance, too, it is preferable that the outlet has a lower portion with a diameter greater than an upper portion.

In another aspect of the present invention, a cyclone collector includes a primary cyclone having a first inlet for drawing external air, and a first outlet for discharging air, and a secondary cyclone connected to the primary cyclone, wherein the first outlet includes a passage portion having a passage, and a closed portion under the passage portion, the closed portion being closed.

Preferably, the secondary cyclone is a plurality of small sized cyclones arranged on an outside of the primary cyclone.

Accordingly, the present invention can improve dust collecting efficiency, and a suction power. The re-fly of the dust collected at the first cyclone can be prevented, effectively.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
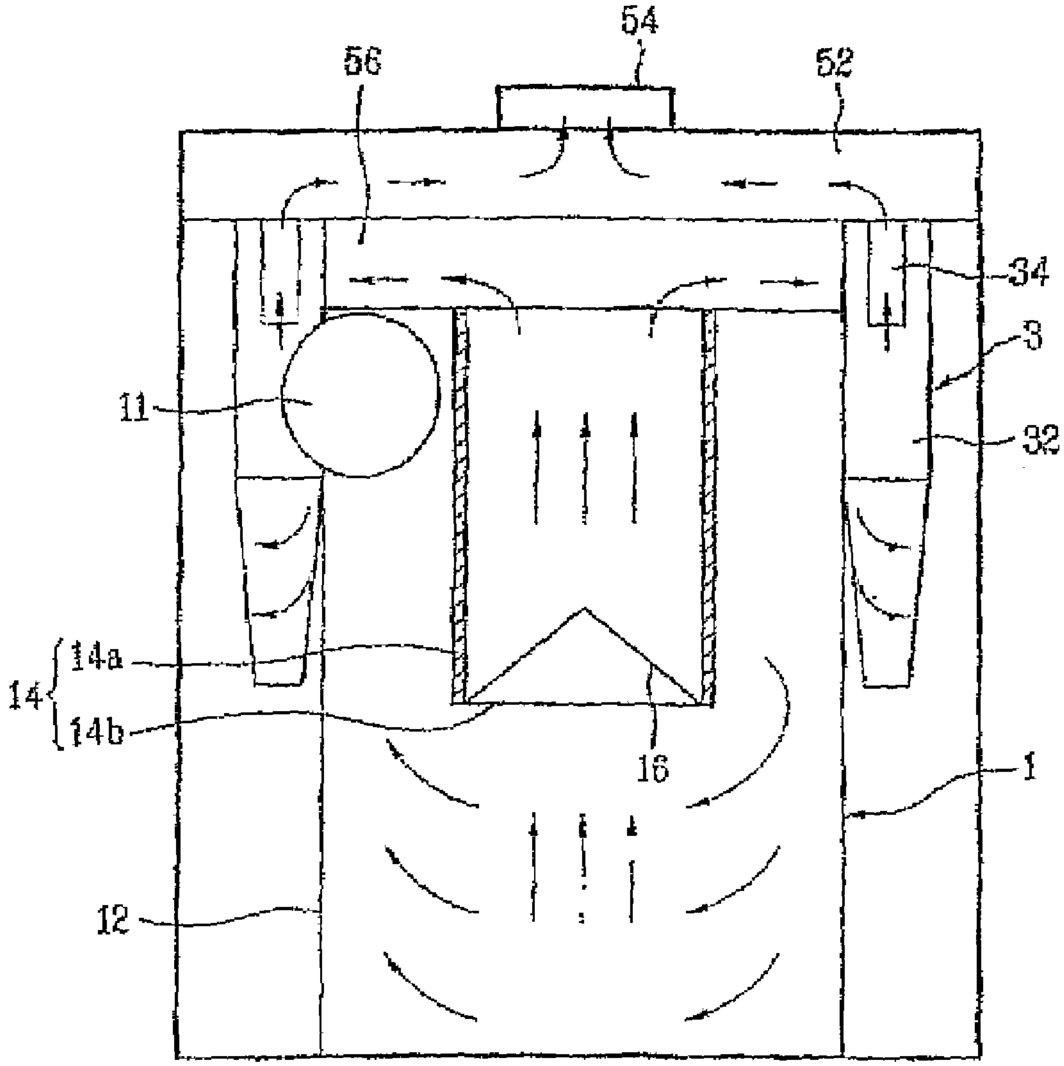
RELATED ART Fig. 1
FIG. 1 illustrates a longitudinal section of a related art cyclone collector, schematically.
Figure 2:
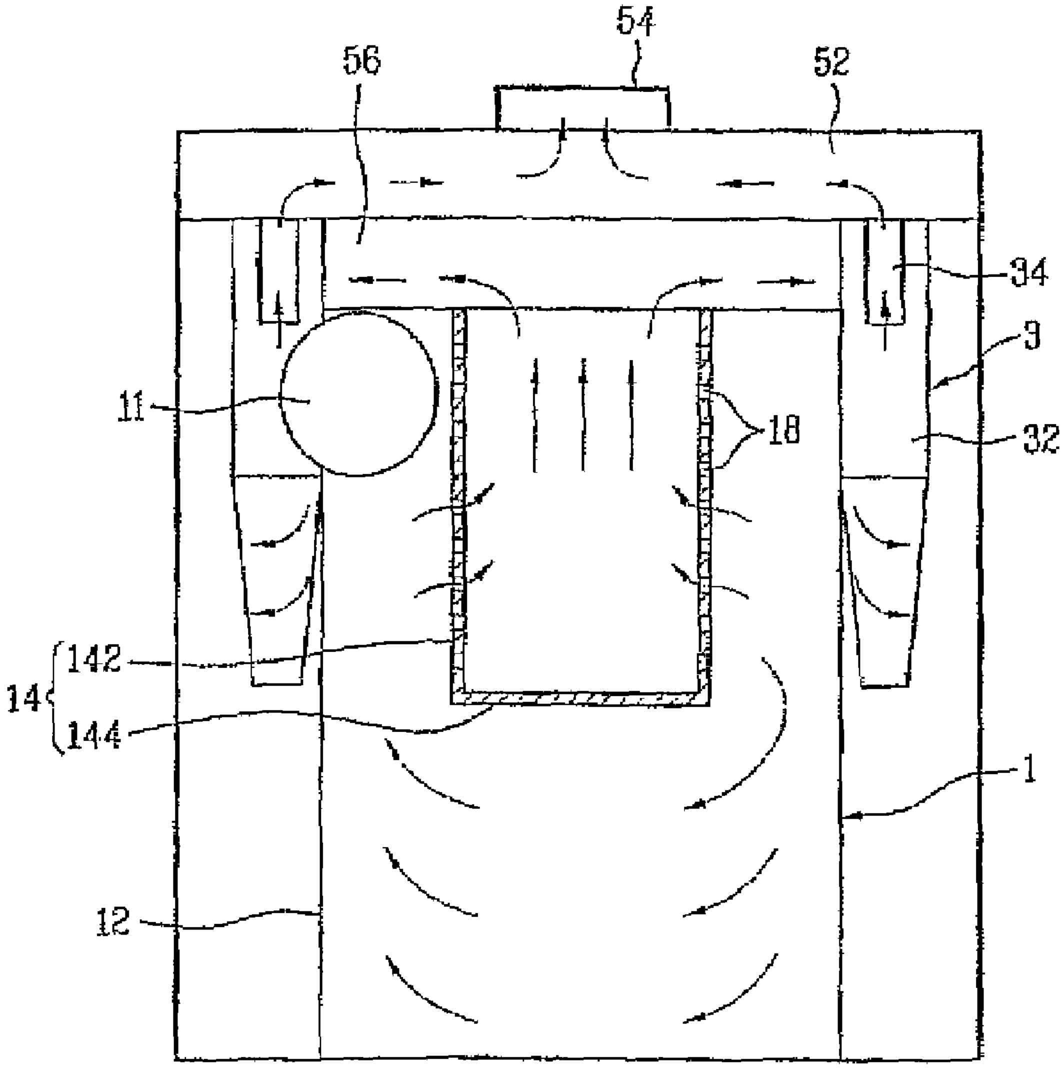
FIG. 2 illustrates a longitudinal section of a cyclone collector in accordance with a preferred embodiment of the present invention, schematically.

Referring to FIG. 2, alike the related art, the cyclone collector includes a primary cyclone 1, and a secondary cyclone 3 connected to the primary cyclone 1. However, in the present invention, a structure of the first inlet 14 of the primary cyclone 1 is different from the related art.

As described in the related art, until the present invention, in general it has been thought that the first outlet 14 of the first cyclone 1 is required to have an opened bottom, and no holes in an upper portion thereof. Ibis is because, in order to collect dust by the cyclone principle, air is required to swim downwardly along the inside wall of the body for separating the dust, and to move upward again substantially along a center axis for exit. According to this, it has been thought that the upper portion of the first outlet 14 is required to have no holes. However, surprisingly, the inventor's research shows that, even if the upper portion of the first outlet 14 has a passage, for an example, perforation 18, the dust collection can be made, effectively.

A structure of the first outlet 14 of the primary cyclone 1 of the present invention will be described in detail.

The first outlet includes a passage portion 142 having a passage, and a closed portion 144 under the passage portion. Any shape of the passage portion is viable as far as air can flow therethrough. For an example, the passage portion 142 may be a perforated portion having a plurality of holes 18. Shape of the hole 18 is not limited to a circle, but any shape of hole is viable. For an example, instead of the circular hole, a passage of a slot shape is also viable. For convenience sake, the perforated portion 142 having the plurality of holes 18 will be described as an example of the passage portion 142.

It is preferable that the perforated portion 142 is a downward extension from a top of, and substantially parallel to, a first body 12 of the primary cyclone 1. The perforated portion 142 has a bottom closed with the closed portion 144. Though a shape of the first outlet 14 is not limited, it is preferable that the shape of the first outlet 14 is cylindrical.

The operation of the foregoing multi-cyclone collector will be described.

Upon putting the multi-cyclone collector into operation, external ditty air is drawn into the first body 12 through the first inlet 11 of the primary cyclone 1. In this instance, since the dirty air is drawn in a tangential direction of the first body 12, the dirty air becomes to have a certain swirling force, to separate comparatively heavy and large dust particles. The separated dust particles are collected on a bottom of the first body 12, while air containing fine dust particles not yet separated, i.e., partially dirty air, is discharged through the first outlet 14. The partially dirty air discharged from the first cyclone 1 to the second cyclone 3 through the first outlet 14 is drawn into a second body 32 through the second inlet (not shown), such that the fine dust particles are collected in the second body 32, and the clean air is discharged to an outside of the collector through the outlet tube 54 via the second outlet 34, and the outlet chamber 52.

In this instance, according to the present invention, since the first outlet 14 has a plurality of holes 18 in the upper portion, and a closed bottom, the air introduced thereto through the first inlet 11 escapes from the first body 12, making less swirling than the related art. That is, because the flow does not come down to the lower portion of the first outlet 14, re-fly of the dust from the bottom can be prevented effectively. Particularly, it is more effective when a dust can or the first body has a low height. Moreover, in view of pressure loss, it is favorable because a larger flow passage area can be secured for the same space. This is because the plurality of holes 18 in the upper portion of the first outlet 14 enables to secure a larger flow passage area than the related art first outlet having an opening only in the bottom. At the end, for a given size of cyclone collector, the present invention has better separation performance, and suction power than the related art.

In the meantime, a shape of the first outlet 14 of the present invention is not limited. However, it is preferable that the first outlet 14 has a diameter which becomes the greater as it goes toward the bottom the farther. Because this configuration makes an air flow path smoother, enabling to improve the dust collecting performance, and enables to secure more holes than the cylindrical outlet for the same height, permitting to reduce the pressure loss.

Figure 3:
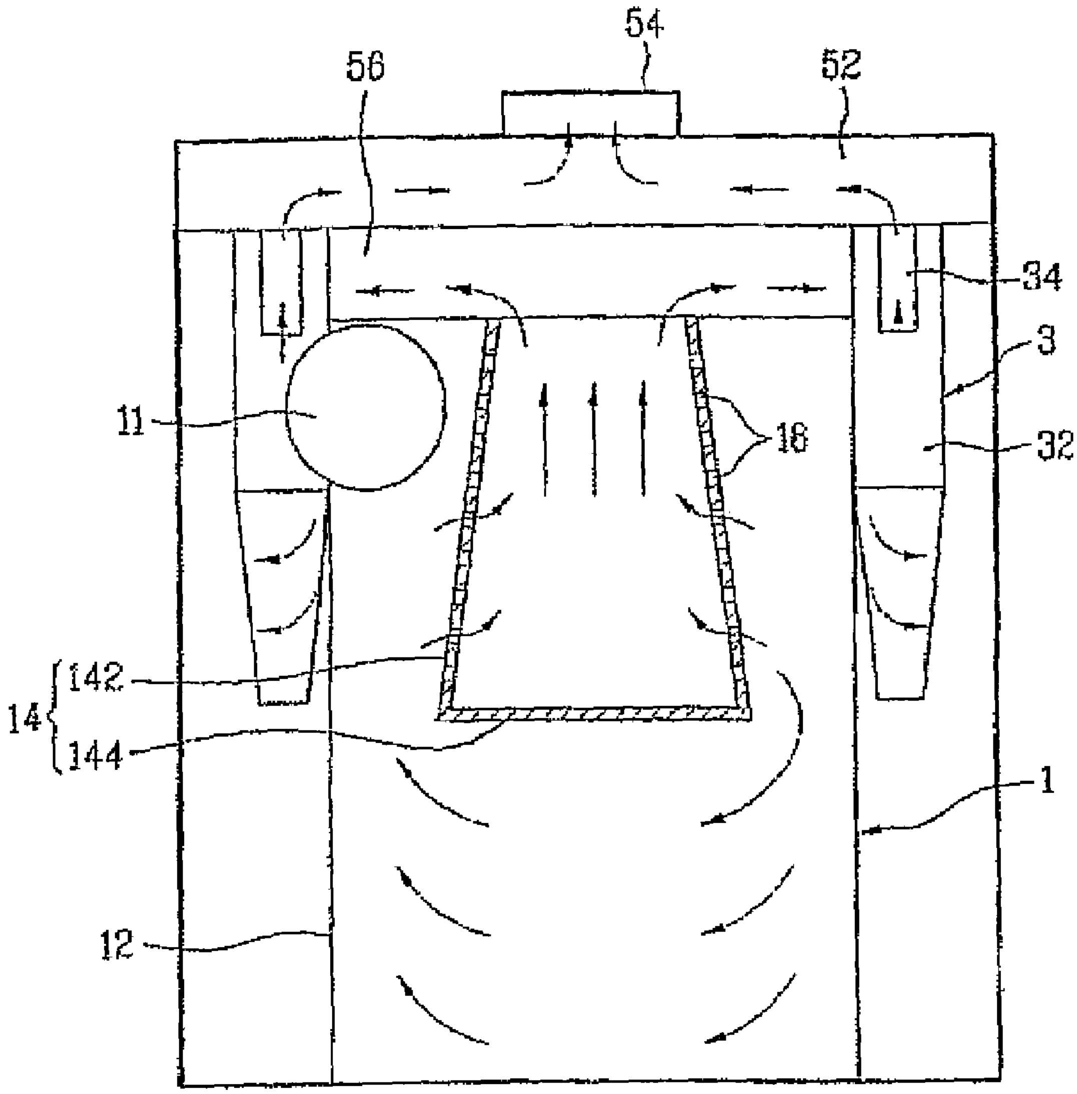
FIG. 3 illustrates a longitudinal section of a cyclone collector in accordance with another preferred embodiment of the present invention, schematically.
Figure 4:
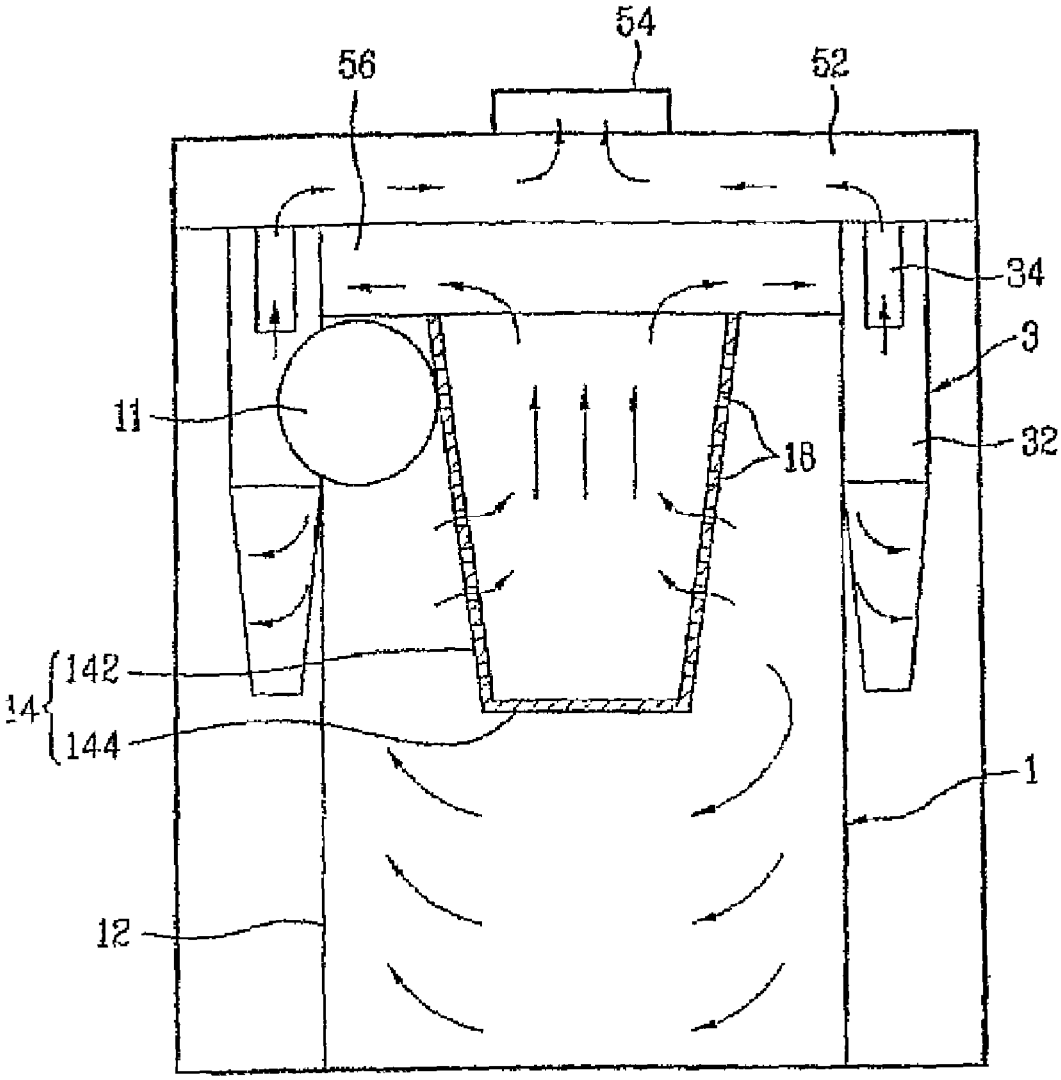
FIGS. 4 and 5 each illustrates a longitudinal section of a cyclone collector in accordance with a preferred embodiment of the present invention, schematically.

For an example, referring to FIG. 3 or 4, the shape of the first outlet 14 may be a circular cone or a circular truncated cone. Or the shape of the first outlet 14 may be a combination of a cylinder and a cone, when it is preferable that an upper portion thereof is cylindrical, and a lower portion thereof is conical.

In the meantime, referring to FIG. 3, if the first outlet 14 is conical, it is preferable that the lower portion has a diameter greater than the upper portion. This is because, as described before, this configuration makes the air flow path smoother, enabling to improve the dust collecting performance, and enables to secure a larger flow passage area, permitting to reduce the pressure loss. Moreover, the relatively large lower portion of the first outlet 14 enables to prevent the dust on the bottom of the first body from re-flying, effectively.

Figure 5:
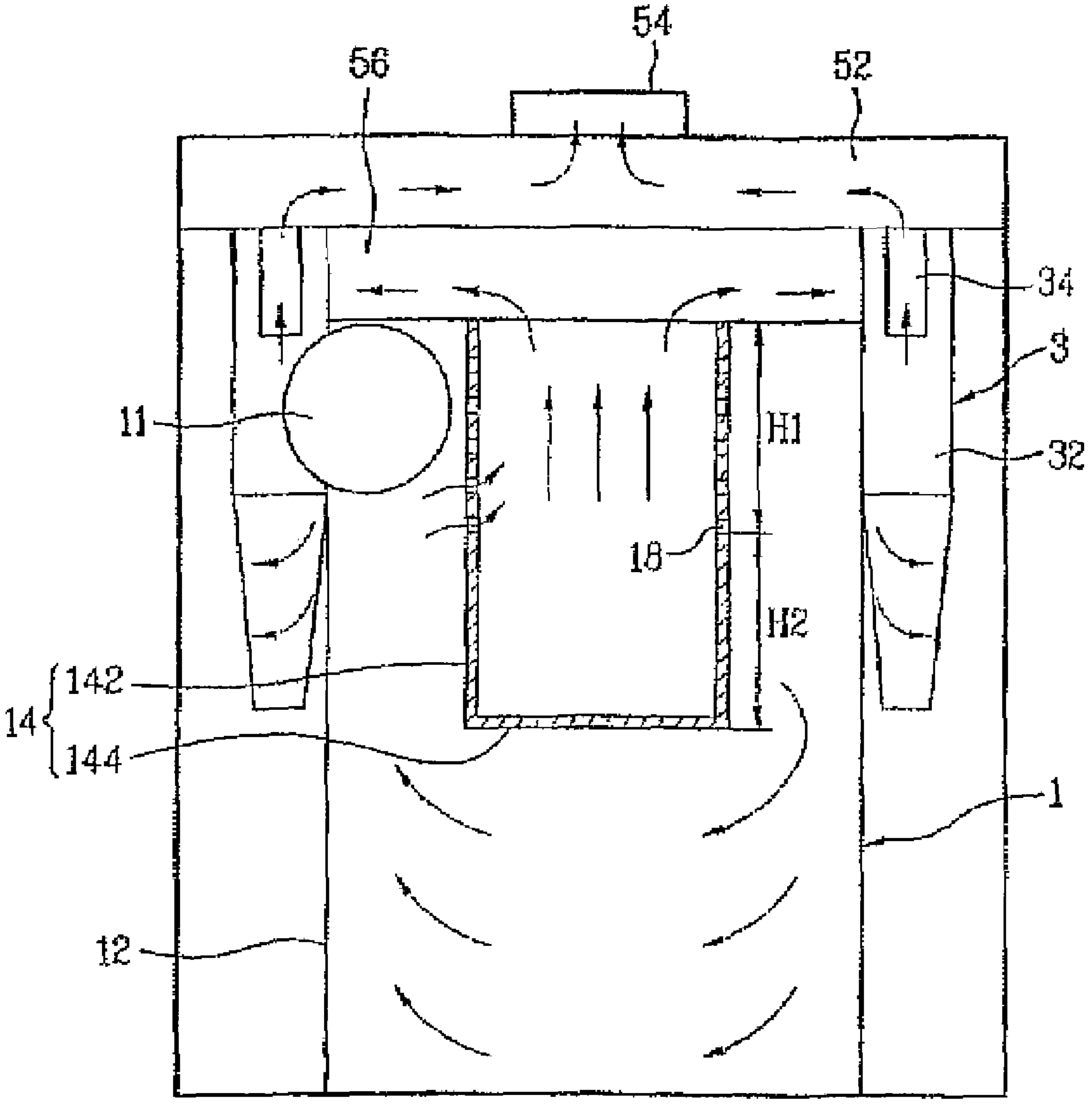

Meanwhile, referring to FIG. 5, instead of forming the passage portion 142 all over the first outlet 14, passages, for an example, a plurality of holes 18 may be formed at a portion of the passage portion 142. That is, the passage portion 142 may be divided into a perforation part H1, and a non-perforation part H2, appropriately.

In the meantime, though above embodiment illustrates and describes a multi-cyclone collector having the secondary cyclone with a plurality of small sized cyclones, the present invention is not limited to this. That is, the present invention may also be applied to a general dual cyclone collector having two cyclone connected to each other, or to a single cyclone collector having only one cyclone.

Moreover, the cyclone collector of the present invention is applicable to a canister type vacuum cleaner, or an upright type vacuum cleaner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As has been described, the cyclone collector of the present invention has the following advantages.

First, the dust collecting performance can be improved. Moreover, the reduction of pressure loss can improve suction power.

Second, the re-fly of the dust collected at the primary cyclone can be prevented, more effectively.

Third, the clogging of the first outlet of the primary cyclone can be prevented, effectively.

The invention claimed is:

1. A cyclone collectors comprising:

a body having an inlet that draws air therein; and a cyclone provided inside of the body, the cyclone having an outlet that discharges air from the body, wherein the outlet includes a passage portion having a passage including a perforated portion having a plurality of holes, and a closed portion under the passage portion, the closed portion being closed, and wherein the outlet has a diameter that increases as it extends toward a lower portion thereof.

2. The cyclone collector as claimed in claim 1, wherein the plurality of holes has a slot shape.

3. The cyclone collector as claimed in claim 1, wherein the passage is formed in a predetermined area of the passage portion.

4. The cyclone collector as claimed in claim 1, wherein the outlet is conical.

5. The cyclone collector as claimed in claim 1, wherein the outlet comprises a lower portion with a diameter greater than a diameter of an upper portion of the outlet.

6. The cyclone collector as claimed in claim 1, wherein the outlet has a shape of a combination of a cone and a cylinder.

7. A cyclone collector, comprising:

a primary cyclone having a first inlet that draws external air therein and a first outlet that discharges air; and a secondary cyclone connected to the primary cyclone, wherein the first outlet includes a passage portion having a passage including a perforated portion having a plurality of holes, and a closed portion under the passage portion, the closed portion being closed, and wherein the first outlet has a diameter that increases as it extends toward a lower portion thereof.

8. The cyclone collector as claimed in claim 7, wherein the secondary cyclone includes a plurality of small sized cyclones arranged on an outside of the primary cyclone.

* * * * *